No. 720,641. PATENTED FEB. 17, 1903.
R. A. VAN PELT.
NUT LOCK.
APPLICATION FILED AUG. 4, 1902.
NO MODEL.
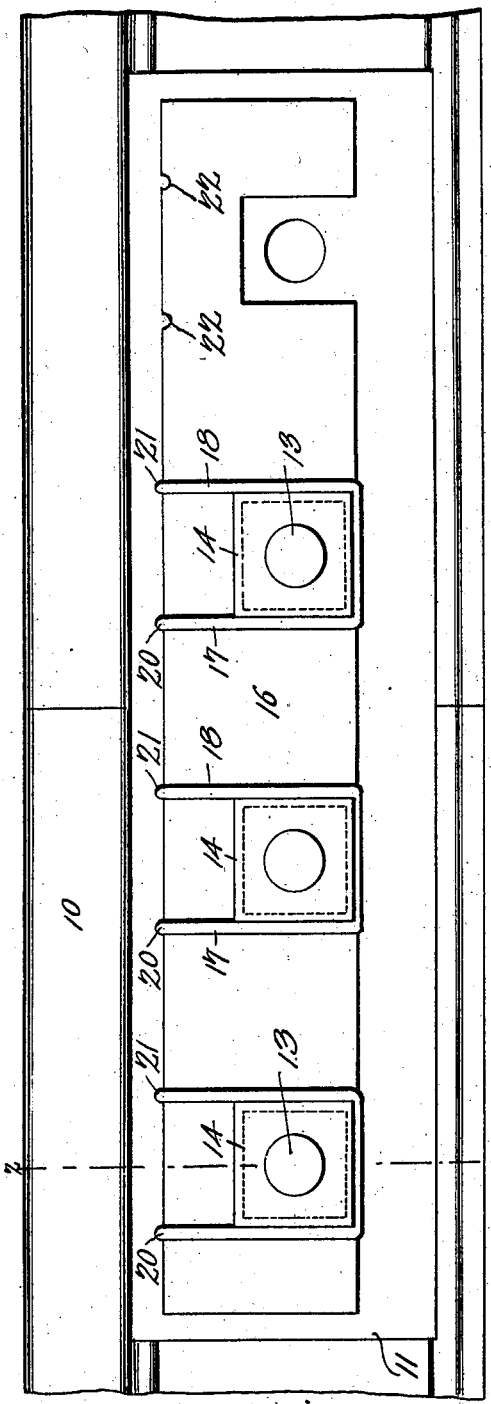
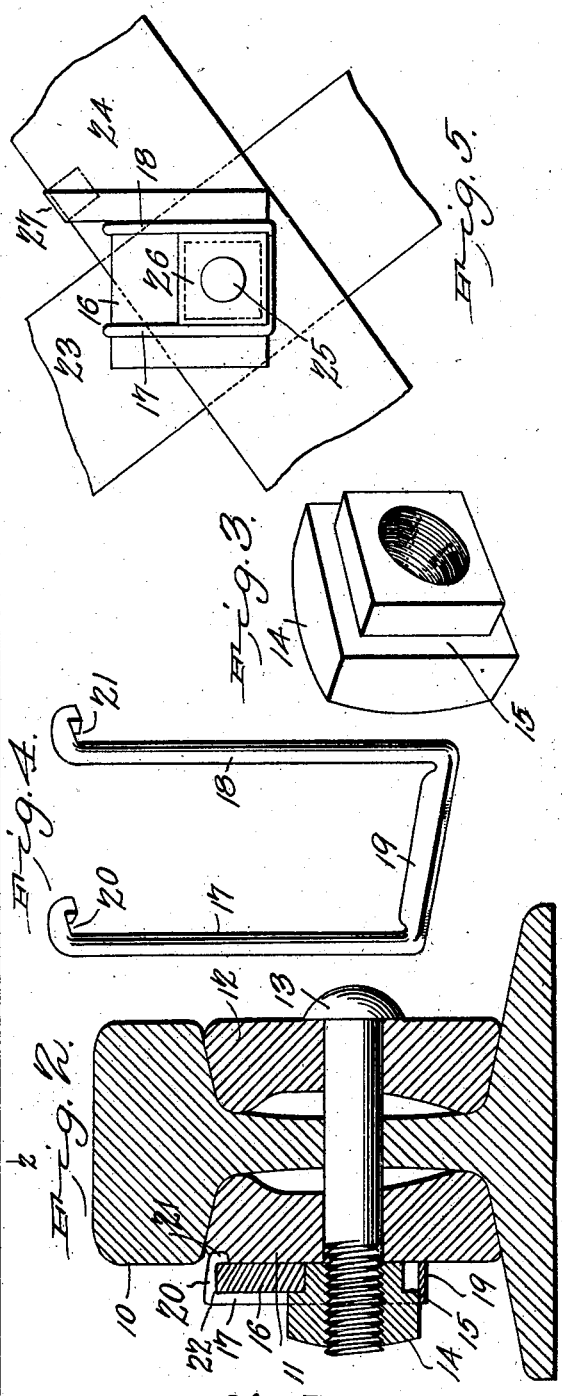
R. A. Van Pelt, Inventor.
Witnesses
by
Attorneys

UNITED STATES PATENT OFFICE.

ROBERT A. VAN PELT, OF HARRISONBURG, VIRGINIA.

NUT-LOCK.

SPECIFICATION forming part of Letters Patent No. 720,641, dated February 17, 1903.

Application filed August 4, 1902. Serial No. 118,342. (No model.)

*To all whom it may concern:*

Be it known that I, ROBERT A. VAN PELT, a citizen of the United States, residing at Harrisonburg, in the county of Rockingham and State of Virginia, have invented a new and useful Nut-Lock, of which the following is a specification.

This invention relates to attachments employed for the purpose of preventing nuts from running backward from bolts, and has for its object the production of a simply-constructed and efficient device which may readily be applied to the nut and which will not weaken the nut or the bolt; and the invention consists in certain novel features of construction, as hereinafter shown and described, and specified in the claims.

In the drawings illustrative of the invention, Figure 1 is a side view of a railway-rail joint with the improvement applied. Fig. 2 is a vertical section on the line 2 2 of Fig. 1. Fig. 3 is a reverse perspective view of the nut detached. Fig. 4 is a detached perspective view of the nut holding yoke or hanger. Fig. 5 is a view illustrating a modification in the manner of applying the invention.

This invention may be employed to lock any of the various forms of nuts employed in various structures—such as railway-rail joints, bridge structures, and the like—and for the purpose of illustration the invention is shown in Figs. 1 and 2 applied to a conventional railway-rail joint and in Fig. 5 applied to a section of a bridge structure to show the adaptability of the invention in various localities.

The rail is represented at 10, the lock-bars or "fish-plates" at 11 12, and the tie-bolts at 13, these parts being of the ordinary construction.

The nuts for the bolts are represented at 14, threaded in the usual manner upon the bolts.

The nuts are formed with a recess 15 encompassing the outer edges of the inner faces, as shown in Fig. 3, forming angular seats for engagement by a lock plate or bar 16, the latter having open cavities or notches in one edge adapted to embrace the reduced ends of the nuts.

When the improvement is employed upon a railway-rail joint, the lock-plate 16 will be provided with a series of the notches spaced apart corresponding to the nuts of the joint, as indicated, so that when the nuts are turned up tightly with the recesses 15 all in alinement or in the same position the recessed lock-plate can be engaged with all of the nuts, as will be obvious. By this simple means the nuts are all firmly locked in position and all movement prevented, the recesses 15 effectually preventing the removal of the lock-plates longitudinally of the nut.

To prevent the lock-plate 16 from being accidentally removed or shaken loose by the jarring motion of the structure to which it is attached, supplemental locking-yoke frames are provided, consisting of U-shaped devices formed with legs 17 18, spaced apart and connected at one end by a cross-bar 19 and provided at their other ends with hooks 20 21, adapted to engage the edge of the lock-plate 16, the cross-bar adapted to engage the side of the nut adjacent to the open side of the recess in the plate 16, as shown.

The cross-bar 19 will preferably be flattened, made thinner, and broadened, as shown, to increase the bearing-surface in engagement with the nut, also to project for a greater distance beneath the line of the plate 16 and to provide for the yielding of the yoke at this point to adapt it to be sprung over the nut.

The hooks 20 21 will be formed to project partially behind the plate 16, so that they will not slip therefrom when the structure is subjected to motion or jarring. At the points where the hooks 20 21 engage the plate 16 the latter will be formed with slight depressions 22 to receive the hooks 20 21 and prevent lateral movement to the legs 17 18. By this simple means the nut and lock-plate are firmly coupled by the yoke device, while at the same time the yoke device may be readily detached when required.

The yoke device will maintain its position firmly against any tendency to become loosened or detached by any jarring or shaking to which the structure will be subjected, but will yield to a force sufficient to overcome the resiliency of the comparatively thin cross-bar 19.

In placing the yoke device in position the hooks are first engaged with the recesses 22 and the comparatively thin cross-bar 19 is sprung over the nut, the cross-bar 19 yielding sufficiently to permit this action, and when in position the reactionary force will bind the parts all firmly together. This is a very important feature of the invention and greatly increases the efficiency of the device as a whole, as all tendency of the parts to become disarranged and disconnected is entirely obviated.

When the device is employed upon nuts closely related, as in railway-rail joints, the plate 16 may be formed with a plurality of the recesses to engage all the nuts in the series, or, in other words, where the bolts are arranged in series one plate 16 may be employed for all the nuts in that series; but where the nuts are disassociated a single lockplate or a plate with one recess will be employed for each nut, as illustrated in Fig. 5, which represents two separate pieces of material 23 24—like the brace members in bridge structures, for instance—shown crossing each other at an angle, with the bolt 25 and nut 26 uniting them. In this modification the plate 16 will be provided with an extension 27, adapted to be folded over one of the bars 23 24, as shown, or otherwise engaged with the part of the structure to lock the plate in position. In this modification the yoke-frame will be arranged in precisely the same manner as in the other structures shown.

The plate 16 may be secured from turning in any suitable manner, and I do not, therefore, wish to be limited to any specific form of fastening; but the means shown is a simple and effective one and will be the form preferably employed.

The projection 27 may be arranged upon any portion of the plate and engaged with any cavity, projection, or other desired portion of the structure.

It will thus be obvious that the plate 16 may be readily adapted to all the various locations where the nuts are employed, and these various modifications will not be a departure from the principle of the invention, as the results produced and the mode of operation are precisely the same.

The relative sizes of the parts may be modified to any required extent without affecting the principle of the invention.

Having thus described my invention, what I claim is—

1. In a nut-lock, the nut threaded upon a bolt, a lock-plate engaging said nut to prevent its rotation, and a yoke device having spaced side members engaging the lock-plate and having a cross-bar yieldably engaging the nut, substantially as described.

2. In a nut-lock, a nut threaded upon a bolt, a lock-plate adapted to engage the nut and prevent its rotation and having spaced recesses, and a yoke device consisting of spaced side members having hooks detachably engaging said recesses and connected by a resilient cross-bar yieldably engaging the nut, substantially as described.

3. In a nut-lock, a nut having a peripheral recess, a lock-plate having an opening of which the walls are adapted to engage said recess, and a yoke device adapted to detachably engage the nut and be supported upon the lock-plate, substantially as described.

4. In a nut-lock, a nut having a recess, a lock-plate having an opening of which the walls engage said recess, and a yoke device having spaced side members terminating in hooks adapted to engage the lock-plate and connected by a cross-bar adapted to yieldably engage the nut, substantially as described.

5. In a nut-lock, a nut having a recess, a lock-plate adapted to engage said recess and prevent the rotation of the nut, and a yoke device consisting of spaced side members engaging the lock-plate and connected by a resilient cross-bar to yieldably engage the nut, substantially as described.

6. A nut-lock comprising a lock-plate having a recess for engaging a nut, and a yoke formed with spaced side members having hooked ends for engaging one edge of said lock-plate and provided with a cross-bar for engaging the nut.

7. A nut-lock comprising a lock-plate having a recess for engaging a nut, and a yoke formed with spaced side members having hooked ends for engaging one edge of said lock-plate and provided with a resilient cross-bar for yieldably engaging the nut.

8. A nut-lock comprising a lock-plate having a recess for engaging a nut, and a clamp having a hooked end extending over and engaging one edge of the lock-plate and provided with means for engaging the remote side of the nut.

9. A nut-lock comprising a lock-plate, and a yoke formed with spaced side members having hooked ends for engaging a recess in one edge of said lock-plate and provided with a cross-bar for engaging a nut.

In testimony that I claim the foregoing as my own I have hereto affixed my signature in the presence of two witnesses.

ROBERT A. VAN PELT.

Witnesses:
FRANK L. HARRIS,
R. MARSHALL PRICE.